B. N. CRIM.
CULINARY VESSEL.
APPLICATION FILED JAN. 22, 1913.

1,112,684.

Patented Oct. 6, 1914.

Witnesses
F. J. Seidenberg
C. C. Hines

Inventor
Belle N. Crim

By Victor J. Evans
Attorney

UNITED STATES PATENT OFFICE.

BELLE NORTHRUP CRIM, OF JORDANVILLE, NEW YORK.

CULINARY VESSEL.

1,112,684.  Specification of Letters Patent.  Patented Oct. 6, 1914.

Application filed January 22, 1913. Serial No. 743,615.

*To all whom it may concern:*

Be it known that I, BELLE NORTHRUP CRIM, a citizen of the United States, residing at Jordanville, in the county of Herkimer and State of New York, have invented new and useful Improvements in Culinary Vessels, of which the following is a specification.

This invention relates to culinary vessels, and particularly to kettles and similar vessels customarily used for cooking vegetables and the like, the object of the invention being to provide a construction of vessel whereby the steam and odors will be discharged into the stove, thereby rendering the vessel easier to handle and at the same time doing away with the annoyances and inconveniences commonly experienced in cooking cabbage, onions or like substances.

A further object of the invention is to provide a culinary vessel of the character described having a vent for the steam and odors, so located that a down draft from the stove will be induced, to draw the steam and odors into the stove; and further to provide a type of odorless cooking vessel which may be conveniently used and easily and inexpensively manufactured.

Figure 1:
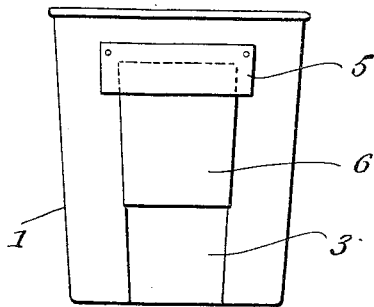
Figure 2:
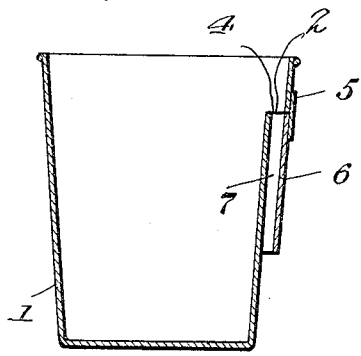
Figure 3:
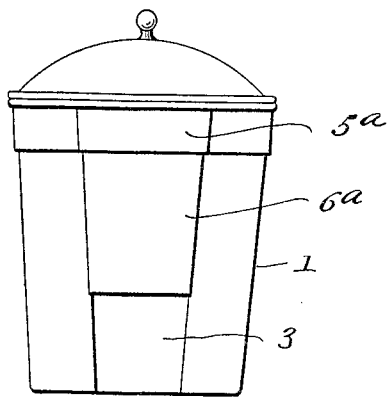
Figure 4:
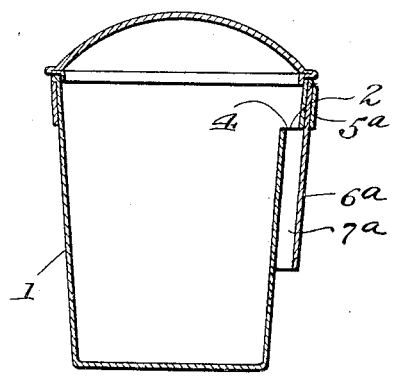

The invention consists of the features of construction, combination and arrangement of parts hereafter fully described and claimed, reference being had to the accompanying drawing, in which:

Figure 1 is a side elevation of a cooking vessel, embodying my invention. Fig. 2 is a vertical section thereof. Fig. 3 is a view similar to Fig. 1 showing a modification. Fig. 4 is a view similar to Fig. 2 of the structure shown in Fig. 3.

Referring to Figs. 1 and 2, 1 designates a kettle or other like cooking vessel, which is adapted to be partially inserted into the fire box of a stove through a pot hole in the top of the stove. This vessel comprises a body of generally circular form, provided at one side below its upper edge with a horizontal transverse slit 2, said side of the body below the slit being reduced from a circular to a flattened condition, as shown at 3, whereby a vapor outlet 4 is formed between the upper circular and lower flat portions at such side of the vessel. A horizontal transverse retaining strip 5 is secured to the upper circular portion aforesaid and depends therefrom in spaced relation to the flattened portion, a shield plate 6 is arranged in spaced relation to said flattened portion to form a vent passage 7 communicating with the outlet, said shield being slidably fitted at its upper edge between the retaining strip and circular portion. This strip, which may be made of metal asbestos or other suitable material, may be easily and quickly applied and removed, provision thus being made to enable the vessel to be easily and quickly cleansed.

It will be observed by reference to Fig. 2 that the shield plate is arranged in the plane of the overhanging circular portion of the vessel at the side named, and is transversely bowed, being held by the retaining strip 5 against the circular wall of the vessel adjacent to the margins of the flattened portion, by which said shield plate is firmly retained in place.

In the modified form of my invention shown in Figs. 3 and 4, the vessel 1 is provided, as in Figs. 1 and 2, with a slot 2, flattened surface 3 and vent opening 4, but the retaining strip 5$^a$ in this construction extends entirely around the body of the vessel and terminates at its lower edge in the horizontal plane of the slit 2, the portion thereof which lies above the slitted and flattened surface being disposed in spaced relation to the overhanging circular portion of the vessel. The shield plate 6$^a$ in this construction is slidably fitted at its upper edge between said overhanging circular portion of the vessel and the said space portion of the retaining strip 5$^a$, whereby it is detachably clamped in position. This shield plate is also transversely bowed and clamped against the circular body of the vessel adjacent to the margins of the flattened portion 3 and depends in spaced relation to said flattened portion to provide a vent passage 7$^a$.

It will be observed that by my invention a vessel is provided which has a vent opening so arranged as to communicate with the upper portion thereof and discharge the steam and odors externally of the cooking compartment and at a lower elevation than the inlet end of the channel, so that when the vessel is applied to a cooking stove and steam is generated therein the pressure of the steam as well as the suction induced in the firebox of the stove causes the steam to pass out into the fire box, carrying with it all odors, which are thereby dissipated. By this means the liability of danger in handling the pot on account of escaping steam, as with ordinary constructions of vessels of this character, is avoided, and at the same time the escape of odors, from the vegetables being cooked, into the house is prevented, the advantages, of which will be manifest. Of course, the surfaces of the vessel in those constructions in which the vessel is flattened for coöperation with a forming member to produce the channel may be otherwise than of flat form, and the forming members may terminate a greater or less distance above the bottom of the vessel, and other changes and modifications within the scope of the claims may be made without departing from the spirit or sacrificing any of the advantages of the invention,

I claim:

1. A culinary vessel comprising a body of generally circular form, said body being provided below its upper edge with a horizontal transverse slit at one side, said side of the body below the slit being reduced from a circular to a flattened condition, whereby a vapor outlet is formed between the upper circular and lower flat portions at such side of the vessel, a horizontal transverse retaining strip secured to the upper circular portion aforesaid and depending therefrom in spaced relation to the flattened portion, and a shield plate disposed in spaced relation to said flattened portion to form a vent passage communicating with the outlet, said shield being slidably fitted at its upper edge between the retaining strip and circular portion.

2. A culinary vessel comprising a body of generally circular form, said body being provided at one side below its upper edge with a horizontal transverse slit and reduced below said slit from a circular to a flattened condition, the portion of such side of the vessel above said slit retaining a circular formation, a retaining strip secured to said circular portion of the vessel at such side and depending below the slit and in spaced relation to the flattened portion, and a shield plate disposed in spaced relation to the flattened portion to provide a vapor passage communicating with said outlet, said shield being slidably fitted at its upper edge in position between the retaining strip and body of the vessel and arranged in the plane of the over-hanging circular portion of the vessel at the side named.

In testimony whereof I affix my signature in presence of two witnesses.

BELLE NORTHRUP CRIM.

Witnesses:
B. H. JONES,
KITTIE B. WAINMAN.